United States Patent [19]
Graham

[11] 3,798,415
[45] Mar. 19, 1974

[54] ELECTRICALLY HEATED COOKING UTENSIL
[75] Inventor: Elwood M. Graham, Biloxi, Miss.
[73] Assignee: M. H. Graham Corporation, Biloxi, Miss.
[22] Filed: Aug. 25, 1972
[21] Appl. No.: 283,894

[52] U.S. Cl............... 219/441, 219/430, 219/436, 219/439, 219/457, 219/462, 219/530, 219/540
[51] Int. Cl............................................ F27d 11/02
[58] Field of Search........... 219/430, 436, 438, 433, 219/439, 441, 442, 457, 462, 459, 530, 540

[56] References Cited
UNITED STATES PATENTS

| 2,880,301 | 3/1959 | Naxon | 219/436 |
|---|---|---|---|
| 3,110,796 | 11/1963 | Bremer | 219/457 |
| 3,445,630 | 5/1969 | Ulam | 219/438 |
| 3,010,006 | 11/1961 | Schwaneke | 219/438 X |
| 1,238,808 | 9/1917 | Patten | 219/459 |
| 3,064,112 | 11/1962 | Hanzel | 219/438 X |
| 2,458,251 | 1/1949 | Challet | 219/540 X |
| 2,908,073 | 10/1959 | Dulin | 219/441 |
| 3,017,492 | 1/1962 | Jepson | 219/439 |
| 3,095,498 | 6/1963 | Foster | 219/441 |
| 3,097,289 | 7/1963 | Clark | 219/442 |

FOREIGN PATENTS OR APPLICATIONS

| 648,211 | 1/1951 | Great Britain | 219/438 |
|---|---|---|---|

Primary Examiner—Volodymyr Y. Mayewsky
Attorney, Agent, or Firm—Browne, Beveridge, De Grandi & Kline

[57] ABSTRACT

A cooking utensil having a cooking vessel of heat conductive metal and an electrical heating element is attached to said cooking vessel by a holding means formed of heat conducting metal. The heating element is pressed fit into a recess of the holding means, and the holding means is attached to the cooking vessel by fasteners. The holding means is in heat conducting relationship with a substantial area of the cooking vessel and has a thickness which diminishes progressively toward the center of the cooking vessel to shorten the time required to bring the central portion of the cooking vessel to the desired temperature.

11 Claims, 3 Drawing Figures

PATENTED MAR 19 1974 3,798,415
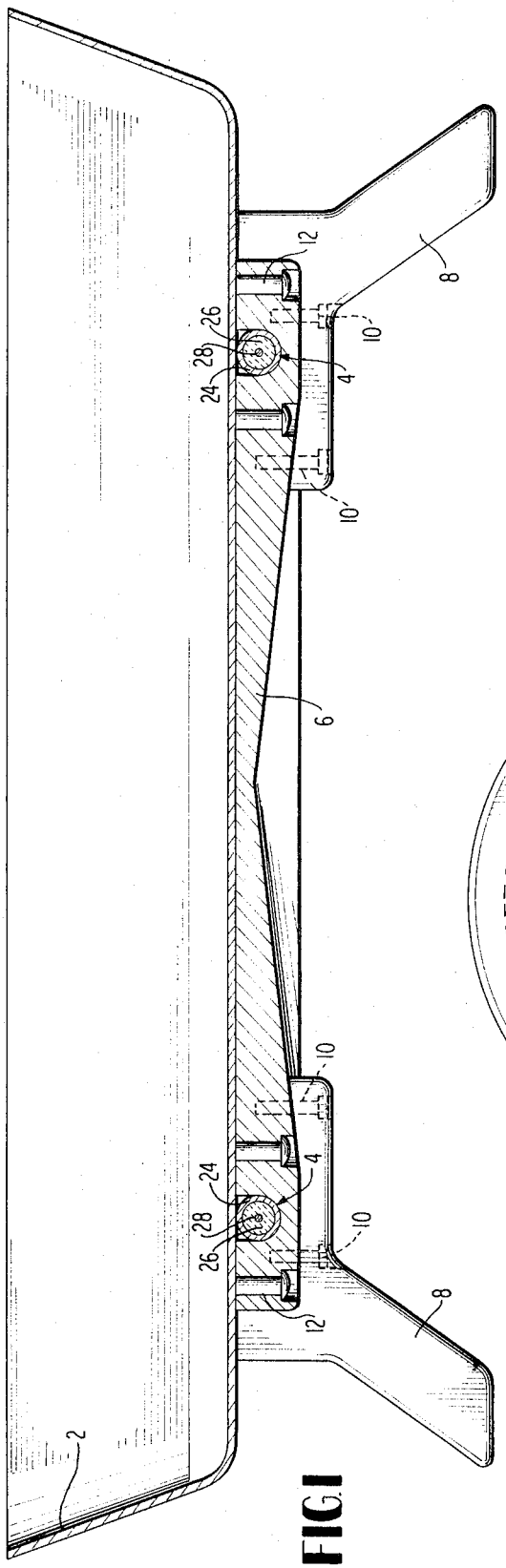
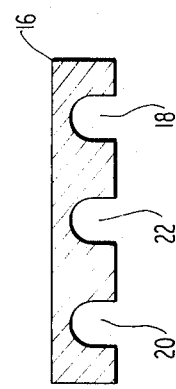
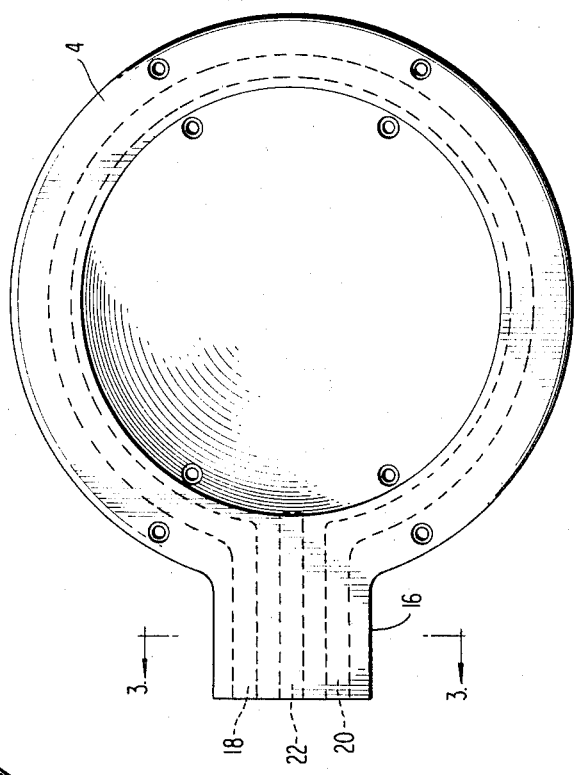
FIG.1
FIG.2
FIG.3

ELECTRICALLY HEATED COOKING UTENSIL

This invention relates to an electrically heated cooking utensil. Its principal utilization is expected to be for electric frypans, but it has potential applicability to the construction of griddles, dutch ovens, sauce pans, roasters and similar appliances.

Electric frypans usually having a cooking vessel with a relatively thick wall of aluminum, with a sheathed heating element permanently bonded to the undersurface of the vessel by a welding or brazing process. The thick walls of such vessels contribute materially to their ability to distribute the heat throughout the cooking surface, and the construction and attachment of the heating element gives such utensils the characteristic of immersibility in water. Some disadvantages of cooking vessels of this nature are that they are expensive to manufacture due to the necessity for a brazing and welding operation, they present a somewhat bulky appearance in contrast to thin-walled cooking vessels often used in the kitchen and they cannot be conveniently repaired and must be discarded when there is a failure of the electrical heating element.

An earlier proposal for a thin-walled electric frypan is disclosed in the Schwaneke U.S. Pat. No. 3,010,006 wherein a housing on the undersurface of the vessel encloses a heat-distributing plate which lies in contact with the undersurface of the cooking vessel, and an electrically insulated holder contains resistance heating coils below the heat-distributing plate. This arrangement relies largely on radiant transmission of heat from the heating coils to the heat-distributing plate, and its construction is such that there must be a housing on the undersurface of the vessel which contributes significantly to its somewhat bulky appearance.

According to the present invention, the undersurface of a relatively thin-walled vessel is in heat-conducting relation with a metallic member which serves both to enclose the heating element and to promote the rapid distribution of heat throughout the cooking surface. The lightweight appearance of the utensil is extremely attractive, its performance is comparable to that of conventional electric frypans, it is manufactured relatively easily and it permits the replacement of defective heating elements when and if required. Any or all of these advantages may be realized by using certain inventive features set forth in this specification.

One feature of the invention involves the use of a single heat conductive metallic holding means for attaching a heating element to a cooking utensil and for promoting the distribution of heat throughout the wall of the cooking utensil.

Another feature of the invention involves an arrangement wherein a heat-distributing element is tapered so as to have a thickness which diminishes progressively in directions away from the heating element.

Another feature of the invention involves the attachment of a sheathed heating element to a cooking utensil by a holding means which permits removal and replacement of defective heating elements and avoids the necessity of discarding the entire utensil upon heating element failure.

Other features of the invention and the advantages attributable thereto will be understood more fully from a study of the drawings and the following description of a preferred embodiment of the invention.

FIG. 1 of the drawings is a sectional view showing a vertical section of an electric frypan constructed according to the principles of the invention;

FIG. 2 is a plan view of the underside of the means which holds the heating element on the vessel; and FIG. 3 is a sectional view seen along the line 3—3 in FIG. 2. e Referring to FIG. 1, it will be seen that an electric frypan constructed according to the principles of the invention includes a main body which in this instance is the cooking vessel 2, an electrical heating element generally designated 4 and a plate 6 which serves the dual function of holding the heating element against the bottom wall of the cooking vessel 2 and distributing heat in a lateral direction along the bottom wall of the cooking vessel. The cooking vessel is supported by legs 8 which are attached to the plate 6 by means of hexagonal-head bolts 10 or other suitable means.

The cooking vessel 2 may be made of various materials, but preferably is a relatively thin walled material having high thermal conductivity properties and a thickness of about 0.100 inch. One such material is aluminum which is clad on either or both sides with stainless steel. The aluminum core has a thickness of 0.090 inch and the stainless steel has a thickness of 0.010 inch. The plate 6 is attached to the undersurface of the vessel by fasteners such as studs which are welded to the undersurface of the cooking vessel. As illustrated, stainless steel stud fasteners 12 extend through apertures in the plate 6 and are welded to the undersurface of the cooking vessel. Threaded fasteners may also be used if interiorly threaded receptacles are provided on the undersurface of the cooking vessel.

In order to prevent the seepage of water into the interface between the plate 6 and the cooking vessel, a sealant is placed at the periphery of this interface. A suitable material for this purpose is the high temperature silicone rubber silastic sold by Dow-Corning under the designation 732 RTV Adhesive Sealant.

In FIG. 1, it will be noted that the plate 6 has a tapered cross section so that its thickness diminishes progressively toward the central portion of the cooking vessel 2. It has been found by experiment that this construction is superior to a plate having a uniform thickness throughout, since the tapered construction shortens the time required to bring the central portion of the main body to cooking temperature. This superior performance may be attributable to an accelerated rate of heat transfer due to the tapered construction, and due to the fact that there is a smaller mass which must be heated in the vicinity of the center of the cooking vessel 2.

The plate 6 is preferably constructed of an aluminum casting which is known to have a high coefficient of thermal-conductivity. Other metals may be used, but it is preferred that any material used for this purpose have a coefficient of thermal conductivity which is at least 0.4 calorie centimeter per second per square centimeter per degree centigrade (cal. cm./sec. cm.$_2$C.°.). Aluminum, copper and silver meet this later criteriorn.

As shown in FIG. 3, the plate 6 is generally circular, with a lateral extension 16 being provided with three recesses 18, 20, and 22 being formed in its upper face. The recesses 18 and 20 accommodate the electrical leads of a conventional heating element, usually having male electrical connectors which receive a female connector on a control unit provided with electrical leads and a temperature-sensing probde. The temperature-sensing probe is received by the recess 22 so as to be in thermal conductive relationship to the mass of aluminum which forms the plate 6. The control unit with the electrical leads and temperature-sensing elements may be of any well-known construction, typical examples of which may be seen in the various patents classified in class 219, subclass 441. The preferred form of electical heating element includes a waterproof sheath 24 of circular cross section formed of aluminum or cold rolled steel with a copper flash. The plate 6 holds the heating element against the undersurface of the cooking vessel 2. Within the sheath 24, there is an electrical insulating material 26 and the electrical resistance 28 which creates the heat when electrical current is passed therethrough. The dimensions of the various elements are such that the sheath 24 is received in the circular extension of the recesses 18 and 20 by an interference fit.

The manner of constructing the vessel according to the invention will be understood by those skilled in the art. The cooking vessel is formed in a usual manner, an aluminum casting is formed in the shape of the plate 6, the purchased heating element 4 is press fit into the recess in the plate 6, and then the studs 12 are projected through the plate 6 and welded to the bottom wall of the cooking vessel 2. The legs 8 are attached by the bolts 10, the control unit (not shown) with the electrical female sockets and temperature-sensing probe is then provided for the purpose of energizing the heating element 4 and controlling the temperature of the appliance. In the event of failure of the heating element 4, the unit may be returned to the factory, the studs 12 and 14 removed and the heating element 4 removed and replaced with a new element. This relatively simple procedure adds to the desirability of this construction since it is a repairable unit unlike the previous units which have had the heating element brazed or welded directly to the undersurface of a cooking vessel.

Of course, there are many modifications and variations to the illustrated and described structures which will adopt one or more of the novel features disclosed herein. Therefore, it is emphasized that the invention is not limited only to the disclosed embodiments but encompasses other structures within the scope and spirit of the claims which follow.

I claim:

1. An immersible electrically heated cooking utensil having a removable and replaceable heating element, comprising,
   a cooking vessel of heat conductive metal for supporting the material to be cooked,
   an electrical heating element below the cooking vessel, said heating element having an electrical resistance heating element enclosed within a body of electrical insulating material,
   holding means for attaching the heating element to the cooking vessel, said holding means including a body of heat conducting metal having a recess receiving the heating element, sealant means for preventing the seepage of water into the interface between the cooking vessel and the holding means, and removable fastener means for attaching the holding means to the undersurface of the cooking vessel.

2. The utensil of claim 1 wherein the holding means is a body of cast aluminum.

3. The utensil of claim 1 wherein the holding means has a laterally oriented aperture for receiving a temperature-sensing probe of a thermostatic control unit.

4. The utensil of claim 1 wherein the cooking vessel is formed of a composite material formed of an aluminum core clad with stainless steel.

5. The utensil of claim 1 wherein the thickness of the cooking vessel is no greater than about 0.150 inch.

6. The utensil of claim 1 wherein the fastener means includes studs which project through the holding means and are welded to the cooking vessel.

7. The utensil of claim 1 wherein the coefficient of thermal conductivity of the material forming the holding means is at least about 0.4 cal. cm./sec. cm.$^2$ C.$^\circ$.

8. The utensil of claim 1 wherein the holding means extends radially inwardly from the recess to conduct heat from the heating element to the central portion of the cooking vessel.

9. The utensil of claim 9 wherein the upper surface of the holding means conforms to the cooking vessel and the thickness of the holding means diminishes progressively toward the central portion of the cooking vessel to shorten the time required to bring said central portion to the desired temperature.

10. The utensil of claim 1 wherein the fastener means includes a threaded fastener for attaching the holding means to the undersurface of the cooking vessel.

11. The utensil of claim 1 wherein the holding means and the heating element are in direct contact with the undersurface of the cooking vessel.

* * * * *